Patented Dec. 3, 1935

2,023,125

UNITED STATES PATENT OFFICE 2,023,125

FACE CREAM

Barney J. Dryfuss, New York, N. Y., and Eugene F. Aubry, Jr., Weehawken, N. J.

No Drawing. Application July 8, 1932, Serial No. 621,512

3 Claims. (Cl. 167—91)

This invention relates to face creams having a semi-solid consistency, and consisting chiefly of condensed buttermilk and unctuous material emulsified with water.

The object of the present invention is to provide an improved face cream having greater cleansing effect and a mild astringent action, and which will also stimulate the skin so as to give it a glow and good color and increase its tone.

The ferments and other biological constituents of buttermilk appear to have other very important and useful effects. The protein constituents of buttermilk form very soft curds which not only aid in making a smooth creamy product, but also improve the results obtained by the cream.

While the precise reasons for the superior results obtained by the use of buttermilk are not known, it is believed that one reason is that some of its constituents play the part of emulsifiers for grease and dirt on the skin or in the pores of the same. Ordinarily, cleansing compounds, such as soap, are slightly alkaline in reaction and act as emulsifiers for grease and dirt partly on account of the salts of the fatty acids and partly on account of the saponifying effect of any free alkali, and also the alkali produced by hydrolysis of such fatty acid salts, on the grease to be removed. Where, as in the present case, the product is acid in reaction, salts of fatty acids will be decomposed, and as there is no free alkali, or alkali by hydrolysis, there can be no saponification.

Buttermilk contains the material by which the butter fat in the original milk was emulsified. In the churning operation, the envelope of such emulsifier around each fat globule is broken and remains behind in the buttermilk. Apparently, such emulsifier is capable of acting again as such in connection with the grease or dirt on the skin. The bulk of the milk proteins, both albumen and casein, also appear to have a similar, though less marked, emulsifying and hence cleansing action.

Buttermilk contains only about 7.5% solids. It is for our purpose too dilute and should be concentrated before mixing with the other ingredients. Usually this concentration involves boiling down the buttermilk in vacuum pans about 3½ or 4 to 1. Such concentration gives a product which is fluid when warm but semi-solid when cold. Another method of concentration involves allowing the milk to whey off, draining off the whey and, if desired, evaporating off a part of the water from the remaining curds.

The lactic acid is formed by bacterial action on the lactose or milk sugar, and this action ceases automatically when the lactic acid content is around 1%. If buttermilk containing 1% of lactic acid is concentrated 1 to 4, the final product will contain 4% lactic acid. The finished cream should not ordinarily contain over 2% of lactic acid, or over 3% at most, and, hence, in spite of the diluting effect of the petrolatum and other ingredients, it is usually necessary to neutralize a part of the acid in the condensed buttermilk.

If the protein contents of buttermilk are concentrated, in part, at least, by wheying off, then it may be necessary to add lactic acid to the mixture to compensate for the lactic acid removed with the whey. The usual limits for lactic acid in the final preparation are from 1 to 2%, with 1.5 the most universally suitable percentage. Results can be obtained with lactic acid as low as 0.5, and, in some cases, the lactic acid may run as high as 3%. It will be understood in this connection that lactic acid means free lactic acid, and the percentages do not include other acids originally present in the milk or added to the preparation for preservative or other purposes, such as boric acid.

Concentrations of 1 to 2% of lactic acid are not sufficient to make the product keep, and, hence, it is desirable to add a preservative, such as 1.0 to 1.5% of sodium benzoate or an equivalent amount of boric acid.

The beneficial action of the lactic acid and, to a lesser extent, that of the other ingredients, is aided by incorporating into the cream a skin penetrant or a fatty or unctuous material containing such substance, such as lanolin, the chief active constituent of which is the skin penetrant cholesterol.

Emulsified with the other ingredients is a considerable percentage of a suitable unguent, such as petrolatum, either solid or liquid. Perfume may be added when and as desired. Other ingredients may be added for special purposes, such as tincture of benzoin to increase the astringent properties of the preparation.

The cream contains from around 30 to 90% of buttermilk, condensed 4 to 1, the balance consisting chiefly of skin penetrant and unctuous material. More usually, the percentage of buttermilk is between 45 and 65%, a very suitable proportion being 55%.

Assuming the condensed buttermilk contains 4% lactic acid, the percentage of lactic acid in the final cream without neutralization would range from 1.2% for the 30% buttermilk product to 3.6% for the 90% buttermilk product. For the former, no neutralizing agent is required. For the latter, sufficient neutralizing agent, such as sodium carbonate, is added to lower the lactic acid content to, say, 1.5%.

If buttermilk containing 1% of lactic acid is allowed to whey off, reduced in volume 50% by drawing off whey, and then the curdy portion concentrated 2 to 1, the final preparation, without adding lactic acid or neutralizing agent, would range from 0.6% to 1.8% lactic acid. Hence, for most proportions within the 30 to 60

90% range, lactic acid would have to be added.

The protein constituents of milk include casein and albumen. The first of these is precipitated as the result of the formation of lactic acid in the milk, the second, while unaffected by acid is precipitated if the milk is heated to around 170° F. Hence, where, as is usually the case, the albumen is desired in precipitated form, the milk should be heated to a sufficiently high temperature to precipitate the albumen. However, milk contains ferments which are killed by prolonged heating to temperatures as high as 170° F., so that, to preserve such ferments, the milk should be subjected to temperatures around 170° F. only long enough to precipitate the albumen. The well known flash pasteurization treatment fulfills these conditions admirably.

Temperatures around 140° F., even when continued for a relatively long period of time, do not kill the ferments, and for this, as well as other reasons, such as avoiding hardening of the protein constituents, the milk is desirably concentrated in vacuo at a temperature around 140° F.

The relative proportion of material containing a skin penetrant, such as lanolin, to unguent, such as petrolatum, may vary widely, one suitable proportion being 5:3.

A very satisfactory formula to use is the following:

| | Percent |
|---|---|
| Buttermilk condensed 4 to 1 with 4% lactic acid | 55 |
| Lanolin | 27 |
| Liquid petrolatum | 16.5 |
| Sodium carbonate | 0.3 |
| Sodium benzoate | 1.2 |
| | 100.0 |

The ingredients are thoroughly mixed and emulsified by any suitable apparatus, if desirable, with the aid of heat. The water in the condensed buttermilk is sufficient to enable the solids to be emulsified into the form of a thick semi-solid emulsion.

The proportion of condensed buttermilk in the finished preparation depends largely on the nature of the skin to be treated. With dry skins, a low percentage of buttermilk and a correspondingly high percentage of unguent gives the best results. With oily skins, the relative proportions should be reversed.

What is claimed is:

1. A face cream, consisting chiefly of condensed buttermilk having its protein content in substantially unhardened form and unctuous material emulsified with the water of the condensed buttermilk.

2. A face cream, comprising 30 to 90 percent of condensed buttermilk having its protein content in substantially unhardened form, free lactic acid between 0.5 and 3 percent, the balance of the product being composed chiefly of unctuous material, and having the insoluble constituents of the cream emulsified with the water in the buttermilk.

3. A face cream, comprising 30 to 90 percent of condensed buttermilk having its protein content in substantially unhardened form, free lactic acid between 0.5 and 3 percent, the balance of the product being composed chiefly of skin penetrant and unctuous material, and having the insoluble constituents of the cream emulsified with the water in the buttermilk.

BARNEY J. DRYFUSS.
EUGENE F. AUBRY, Jr.